United States Patent
Wu et al.

(10) Patent No.: US 9,403,973 B2
(45) Date of Patent: Aug. 2, 2016

(54) COMPOSITION, THERMOPLASTIC VULCANIZATES MADE THEREFROM AND ARTICLES FORMED FROM THE SAME

(71) Applicant: Dow Global Technologies LLC, Midland, MI (US)

(72) Inventors: Xiaosong Wu, Sugar Land, TX (US); Manu Rego, Houston, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/647,563

(22) PCT Filed: Dec. 23, 2013

(86) PCT No.: PCT/US2013/077378
§ 371 (c)(1),
(2) Date: May 27, 2015

(87) PCT Pub. No.: WO2014/100802
PCT Pub. Date: Jun. 26, 2014

(65) Prior Publication Data
US 2015/0315373 A1    Nov. 5, 2015

Related U.S. Application Data

(60) Provisional application No. 61/740,553, filed on Dec. 21, 2012.

(51) Int. Cl.
*C08L 23/26* (2006.01)
*C08L 23/08* (2006.01)

(52) U.S. Cl.
CPC ............. *C08L 23/26* (2013.01); *C08L 23/0815* (2013.01); *C08L 2205/02* (2013.01); *C08L 2312/00* (2013.01)

(58) Field of Classification Search
CPC ..... C08L 23/26; C08L 23/0815; C08L 23/12; C08L 2205/02; C08L 2312/00
See application file for complete search history.

(56) References Cited

U.S. PATENT DOCUMENTS

| | | |
|---|---|---|
| 3,037,954 A | 6/1962 | Gessler et al. |
| 3,806,558 A | 4/1974 | Fischer et al. |
| 4,104,210 A | 8/1978 | Coran et al. |
| 4,116,914 A | 9/1978 | Coran et al. |
| 4,130,535 A | 12/1978 | Coran et al. |
| 4,141,863 A | 2/1979 | Coran et al. |
| 4,141,878 A | 2/1979 | Coran et al. |
| 4,173,556 A | 11/1979 | Coran et al. |
| 4,207,404 A | 6/1980 | Coran et al. |
| 4,271,049 A | 6/1981 | Coran et al. |
| 4,287,324 A | 9/1981 | Coran et al. |
| 4,288,570 A | 9/1981 | Coran et al. |
| 4,299,931 A | 11/1981 | Coran et al. |
| 4,311,628 A | 1/1982 | Abdou-Sabet et al. |
| 4,338,413 A | 7/1982 | Coran et al. |
| 2005/0009942 A1 * | 1/2005 | Walton ..................... 521/134 |
| 2007/0225446 A1 | 9/2007 | Nakano et al. |

OTHER PUBLICATIONS

PCT Search Report dated Mar. 25, 2015; from PCT corresponding Application No. PCT/US2013/077378.
PCT IPRP dated Jul. 2, 2015; from PCT corresponding Application No. PCT/US2013/077378.

* cited by examiner

*Primary Examiner* — Nathan M Nutter

(57) ABSTRACT

A composition comprising at least the following (A) an ethylene/α-olefin copolymer; (B) an olefin-based polymer; (C) a crosslinking agent; and (D) a multifunctional acrylate coagent; wherein the ethylene/α-olefin copolymer of component A) has the following properties: (i) has a density from 0.855 to 0.875 g/cc; and (ii) a Mooney Viscosity (ML 1+4, 121° C.) from 10 to 100 is provided.

11 Claims, No Drawings

COMPOSITION, THERMOPLASTIC VULCANIZATES MADE THEREFROM AND ARTICLES FORMED FROM THE SAME

BACKGROUND OF THE INVENTION

Thermoplastic vulcanizates (TPVs) are produced via dynamic vulcanization of non-miscible blends of a rubber and a thermoplastic, that is, the selective cross-linking of the rubber, while melt mixing with the thermoplastic. As a result, products are obtained which consist of cross-linked rubber particles dispersed in a thermoplastic matrix, which provides both the elasticity and melt processability of TPVs. Compared to their non-crosslinked TPE counterparts, TPVs have superior properties in terms of heat resistance, compression set, chemical resistance and tensile strength. The majority of commercial TPVs are based on blends of EPDM with polypropylene (PP), which are typically crosslinked using a phenol derivative.

Thermoplastic vulcanizates may advantageously be produced by employing a peroxide cure system. "Peroxide-cured EPDM/PP TPV" generally exhibit lower color and lower residues than phenolic-cured TPV products, while maintaining good thermal stability and good compression set. U.S. Pat. No. 3,806,558 discloses that ethylene propylene-diene terpolymers (EPDM) can be partially cured by dynamic vulcanization, in the presence of polypropylene, to provide reprocessable materials with good physical properties. The diene component in polymer chains improves the crosslinking efficiency, but results in poor environmental degradation resistance. Alternatively, an ethylene-α-olefin copolymer without a diene group can be used as rubber phase in peroxide cured TPV. Reference JP 3359505 discloses a thermoplastic polymer composition with improved environmental degradation by using an ethylene-octene copolymer produced by metallocene catalyst.

There remains a need for new compositions for TPV applications with improved compression set, extrusion surface quality, and good mechanical properties.

SUMMARY OF THE INVENTION

The invention provides a composition comprising at least the following:
(A) an ethylene/α-olefin copolymer;
(B) an olefin-based polymer;
(C) a crosslinking agent; and
(D) a multifunctional acrylate coagent;
wherein the ethylene/α-olefin copolymer of component (A) has the following properties:
(i) has a density from 0.855 to 0.875 g/cc; and
(ii) a Mooney Viscosity (ML 1+4, 121° C.) from 10 to 100.

DETAILED DESCRIPTION OF EMBODIMENTS OF THE INVENTION

Embodiments of the invention provide a composition, thermoplastic vulcanizates made therefrom and articles made therefrom.

As discussed above, the invention provides a composition comprising at least the following:
(A) an ethylene/α-olefin copolymer;
(B) an olefin-based polymer;
(C) a crosslinking agent; and
(D) a multifunctional acrylate coagent;
wherein the ethylene/α-olefin copolymer of component (A) has the following properties:
(i) has a density from 0.855 to 0.875 g/cc; and
(ii) a Mooney Viscosity (ML 1+4, 121° C.) from 10 to 100.

An inventive composition may comprise a combination of two or more embodiments described herein.

In a further embodiment, the α-olefin is selected from C3-C10 α-olefins. In yet a further embodiment, the ethylene/α-olefin copolymer is selected from the group consisting of ethylene/1-octene copolymer; ethylene/1-butene copolymer, ethylene/propylene copolymer, and combinations of two or more thereof.

In one embodiment, the molecular weight distribution, Mw/Mn, of the ethylene/α-olefin copolymer is from 2 to 5. All individual values and subranges are disclosed herein and included herein; for example, the Mw/Mn of the ethylene/α-olefin copolymer may range from a lower limit of 2, 2.5, 3, 3.5, 4 or 4.5 to an upper limit of 2.5, 3, 3.5, 4, 4.5 or 5. For example, the Mw/Mn of the ethylene/α-olefin copolymer may be from 2 to 5, or in the alternative, the ethylene/α-olefin copolymer may be from 3.5 to 5, or in the alternative, the ethylene/α-olefin copolymer may be from 2 to 3.5, or in the alternative, the ethylene/α-olefin copolymer may be from 3 to 4.

The olefin-based polymer of component B) may be a homopolymer or a copolymer. A homopolymer is a polymer solely having units derived from a single monomer. In one specific embodiment, the olefin-based polymer is a propylene-based polymer. A propylene-based polymer, as used herein, means a polymer for which a majority of the units are derived from propylene, based on the weight of the polymer.

In another embodiment, the olefin-based polymer is selected from the group consisting of polypropylene homopolymer, propylene/ethylene copolymer, and combinations thereof.

In one embodiment, the crosslinking agent, component (C) is selected from a peroxide crosslinking agent, an azide crosslinking agent, or combinations thereof. In a further embodiment, the crosslinking agent is present in an amount from 0.5 to 6 PHR, or from 0.5 to 3 PHR (based on amount of component (A)). In one embodiment, the crosslinking agent is selected from the group consisting of organic peroxides. In yet another embodiment, the crosslinking agent is 2,5-dimethyl-2,5-di(t-butylperoxy)hexane; 1,3 1,4-Bis(tert-butylperoxyisopropyl) benzene; or a combination thereof.

In one embodiment, the weight ratio crosslinking agent to coagent is from 2:1 to 1:4, further from 1:1 to 1:4. All individual values and subranges from 2:1 to 1:4 are disclosed herein and included herein. For example, the weight ratio of crosslinking agent to coagent may be 1.5:1, 1:1, 1:2, 1:3, or 1:4.

In one embodiment, component A is present in an amount from 55 to 85 weight percent, based on the sum weight of components A and B.

In one embodiment, component A is present in an amount from 50 to 80 weight percent, based on the sum weight of components A and B.

In one embodiment, component A is present in an amount from 60 to 75 weight percent, based on the sum weight of components A and B.

In one embodiment, component B is present in an amount from 45 to 15 weight percent, based on the sum weight of components A and B.

In one embodiment, component B is present in an amount from 40 to 20 weight percent, based on the sum weight of components A and B.

In one embodiment, component B is present in an amount from 25 to 40 weight percent, based on the sum weight of components A and B.

In one embodiment, the sum of the weight of polymer components (A) and (B) are present in an amount greater than 30, or greater than 40, or greater than 50, or greater than 60, or greater than 70, or greater than 80 weight percent, or greater than 90 weight percent, based on the weight of the composition.

In one embodiment, the sum of the weight of polymer components (A) and (B) are present in an amount greater than 50 based on the weight of the polymer components of the composition.

The invention also provides a crosslinked composition formed from an inventive composition.

In one embodiment, the crosslinked composition has a compression set, at 22 hr at 23° C., less than, or equal to, 40%. In an alternative embodiment, the crosslinked composition has a compression set, at 22 hr at 23° C., less than, or equal to, 35%. In another alternative embodiment, the crosslinked composition has a compression set, at 22 hr at 23° C., less than, or equal to, 30%.

In one embodiment, the crosslinked composition has a compression set, at 22 hr at 70° C., less than, or equal to, 50%. In an alternative embodiment, the crosslinked composition has a compression set, at 22 hr at 70° C., less than, or equal to, 48%. In another alternative embodiment, the crosslinked composition has a compression set, at 22 hr at 70° C., less than, or equal to, 46%.

In one embodiment, the crosslinked composition has a compression set, at 70 hr at 120° C., less than, or equal to, 70%. In another embodiment, the crosslinked composition has a compression set, at 70 hr at 120° C., less than, or equal to, 68%. In another alternative embodiment, the crosslinked composition has a compression set, at 70 hr at 120° C., less than, or equal to, 65%.

In one embodiment, the composition comprises less than 1 ppm, based on the total weight of the composition, of any component selected from the group consisting of benzene, benzene derivatives, isocyanurate, isocyanurate derivatives, and combinations thereof.

In one embodiment, the crosslinked composition has a gel content greater than, or equal to, 40 wt %, or greater than, or equal to, 60 wt %, or greater than, or equal to, 80 wt %.

The invention also provides an article comprising at least one component formed from an invention composition. In a further embodiment, the article is a door profile, a window profile, a gasket, or a molded part.

An inventive composition may comprise a combination of two or more embodiments as described herein.

A crosslinked composition may comprise a combination of two or more embodiment as described herein.

An inventive article may comprise a combination of two or more embodiments as described herein.

The ethylene/α-olefin copolymer, polymer component A, may comprise a combination of two or more embodiments as described herein.

The olefin-based polymer of polymer component B may comprise a combination of two or more embodiments as described herein.

In one embodiment, the inventive crosslinked composition can be pelletized.

The crosslinking agent, component C, may comprise a combination of two or more embodiments as described herein.

Ethylene/α-Olefin Copolymer (Component (A))

The ethylene/α-olefin copolymer has a density from 0.855 g/cc to 0.875 g/cc, (1 cc=1 cm$^3$).

In a further embodiment, the ethylene/α-olefin copolymer has a density from 0.855 to 0.865 g/cc, or from 0.865 to 0.875 g/cc, or from 0.860 to 0.870 g/cc, or from 0.858 to 0.875 g/cc.

In one embodiment, the ethylene/α-olefin copolymer has a Mooney Viscosity (ML 1+4, 121° C.) from 10 to 100. In a further embodiment, the ethylene/α-olefin copolymer has a Mooney Viscosity (ML 1+4, 121° C.) from 10 to 50, or from 25 to 50, or from 20 to 60, or from 20 to 70, or from 20 to 80, or from 20 to 90, or from 40 to 90, or from 50 to 80.

In one embodiment, the ethylene/α-olefin copolymer has molecular weight distribution (Mw/Mn) from 2.0 to 5.0, or from 2.0 to 4.0, or from 2.0 to 3.5, or from 2.0 to 3.0, as determined by GPC.

In one embodiment, the ethylene/α-olefin copolymer has an $I_{10}/I_2$ ratio greater than, or equal to, 7; or greater than, or equal to 7.5; or greater than, or equal to 8; or greater than, or equal to 8.5; or greater than, or equal to 9.

In one embodiment, the ethylene/α-olefin copolymer has an $I_2$ from 0.1 to 5.0, further 0.1 to 4.0, further 0.1 to 3.5 g/10 min. In another embodiment, the ethylene/α-olefin copolymer has an $I_2$ from 0.2 to 2.0 g/10 min. In another embodiment, the ethylene/α-olefin copolymer has an $I_2$ from 0.3 to 1.0. In another embodiment, the ethylene/α-olefin copolymer has an $I_2$ from 0.3 to 0.9.

Comonomers include, but are not limited to, propylene, isobutylene, 1-butene, 1-pentene, 1-hexene, 3-methyl-1-pentene, 4-methyl-1-pentene, and 1-octene, and mixtures thereof. Typically and preferably, the ethylene is copolymerized with one C3-C20 α-olefin, and preferably one C3-C10 α-olefin. Preferred comonomers include propylene, 1-butene, 1-pentene, 1-hexene, 1-heptene and 1-octene, and more preferably include propene, 1-butene, 1-hexene and 1-octene.

Illustrative copolymers include ethylene/propylene (EP) copolymers, ethylene/butene (EB) copolymers, ethylene/hexene (EH) copolymers, ethylene/octene (EO) copolymers. Preferred copolymers include EB and EO polymers.

Ethylene/α-olefin copolymers useful in the composition include those available under the tradenames ENGAGE 8842, ENGAGE HM7487 AND ENGAGE 8180, all available from The Dow Chemical Company. Other examples include EXACT 5061 and EXACT 5062 from Exxon Mobile Chemical Company, and TAFMER A-0250 and TAFMER A-0550 from Mitsui Chemicals.

An ethylene/α-olefin copolymer may comprise a combination of two or more embodiments as described herein.

Olefin-Based Polymer (Component (B))

In one embodiment, the olefin-based polymer is an ethylene-based polymer or a propylene-based polymer.

In one embodiment, the olefin-based polymer is selected from the group consisting of the following: polypropylene homopolymers, propylene/ethylene copolymers, propylene/α-olefin copolymers, low density polyethylenes (LDPEs), high density polyethylenes (HDPEs), and a heterogeneously branched ethylene/α-olefin interpolymers and further copolymers. Heterogeneously branched ethylene-based interpolymers, and further copolymers, are typically prepared with a Ziegler/Natta catalyst system. These linear interpolymers and copolymers lack long chain branching, or measureable amounts of long chain branching. In a further embodiment, the α-olefin is selected from propylene, 1-butene, 1-hexene or 1-octene.

In one embodiment, the olefin-based polymer of Component B has a melting point (Tm) greater than 140° C., or greater than 150° C. In a further embodiment, the olefin-based polymer is a propylene-based polymer.

In one embodiment, the olefin-based polymer of Component B has a melting point (Tm) less than 165° C., or less than 160° C. In a further embodiment, the olefin-based polymer is a propylene-based polymer.

In one embodiment, the olefin-based polymer of Component B is propylene-based polymer having a melting point (Tm) less than 165° C., or less than 160° C.

In one embodiment, the olefin-based polymer of Component B has a density greater than, or equal to, 0.855, or greater than, or equal to, 0.860, or greater than, or equal to, 0.870 g/cc (1 cc=1 em$^3$). In a further embodiment, the olefin-based polymer is a propylene-based polymer.

In one embodiment, the olefin-based polymer of Component B is a propylene-based polymer having a density greater than, or equal to, 0.865, or greater than, or equal to, 0.870, or greater than, or equal to, 0.875 g/cc, or greater than, or equal to, 0.890 g/cc, or greater than, or equal to, 0.895 glee (1 cc=1 cm$^3$).

In one embodiment, the olefin-based polymer of Component B is a propylene-based polymer having a density less than, or equal to, 0.900 g/cc.

In one embodiment, the olefin-based polymer is a propylene-based polymer.

In one embodiment, the propylene-based polymer is selected from polypropylene homopolymers, propylene/α-olefin interpolymers, or propylene/ethylene interpolymers.

In one embodiment, the propylene-based polymer of Component B has a melt flow rate (MFR) from 0.5 to 50, or from 0.5 to 20, or from 0.5 to 10, or from 0.5 to 5 g/10 min. In a further embodiment, the propylene-based polymer is a polypropylene homopolymer. In another embodiment, propylene-based polymer is a propylene/α-olefin interpolymer, and preferably a copolymer. In another embodiment, propylene-based polymer is a propylene/ethylene interpolymer, and preferably a copolymer.

In one embodiment, the polypropylene polymer has a heat of fusion ($\Delta H_f$), as determined by DSC, greater than, or equal to, 75 J/g, or greater than, or equal to, 80 J/g, greater than, or equal to, 85 J/g. In a further embodiment, the propylene-based polymer is a polypropylene homopolymer. In another embodiment, propylene-based polymer is a propylene/α-olefin interpolymer, and preferably a copolymer. In another embodiment, propylene-based polymer is a propylene/ethylene interpolymer, and preferably a copolymer.

In one embodiment, the propylene-based polymer has a melting point (Tm), as determined by DSC, greater than, or equal to, 140° C., or greater than, or equal to, 150° C., or greater than, or equal to, 155° C.

In one embodiment, the propylene-based polymer has a melting point (Tm), as determined by DSC, less than, or equal to, 170° C., or less than, or equal to, 165° C.

In one embodiment, the propylene-based polymer has a melting point from 140° C. to 165° C., or from 150° C. to 165° C., or from 155° C. to 165° C. In a further embodiment, the propylene-based polymer is a polypropylene homopolymer. In another embodiment, propylene-based polymer is a propylene/α-olefin interpolymer, and preferably a copolymer. In another embodiment, propylene-based polymer is a propylene/ethylene interpolymer, and preferably a copolymer.

In one embodiment, the propylene-based polymer has a molecular weight distribution Mw/Mn (MWD), greater than, or equal to, 2.5, or greater than, or equal to, 3.0, or greater than, or equal to, 4.0. In a further embodiment, the propylene-based polymer is a polypropylene homopolymer. In another embodiment, propylene-based polymer is a propylene/α-olefin interpolymer, and preferably a copolymer. In another embodiment, propylene-based polymer is a propylene/ethylene interpolymer, and preferably a copolymer.

In one embodiment, the propylene-based polymer has a molecular weight distribution Mw/Mn (MWD), less than, or equal to, 20, or less than, or equal to, 15, or less than, or equal to, 10. In a further embodiment, the propylene-based polymer is a polypropylene homopolymer. In another embodiment, propylene-based polymer is a propylene/α-olefin interpolymer, and preferably a copolymer. In another embodiment, propylene-based polymer is a propylene/ethylene interpolymer, and preferably a copolymer.

In one embodiment, the propylene-based polymer is a propylene/ethylene interpolymer, and preferably a copolymer. In a further embodiment, propylene/ethylene copolymer comprises less than, or equal to, 3 weight percent ethylene, based on the weight of the composition.

In one embodiment, the propylene-based polymer is a propylene homopolymer.

Examples of useful polypropylene homopolymer and propylene/ethylene copolymer include VERSIFY 2000 (available from The Dow Chemical Company), VERSIFY 2200 (available from The Dow Chemical Company), PROFAX 6823 (available from LyondellBasell, Inc.), ARISTECH DOO8M (available from Aristech Corp), HF 136MO (available from Borealis AG), FOO8F (available from Sunoco, Inc.), and Braskem H110-02N Polypropylene Resin.

A propylene-based polymer may comprise a combination of two or more embodiments described herein.

A polypropylene homopolymer may comprise a combination of two or more embodiments as described herein.

A propylene/α-olefin interpolymer, or copolymer, may comprise a combination of two or more embodiments as described herein.

A propylene/ethylene interpolymer, or copolymer, may comprise a combination of two or more embodiments as described herein.

An olefin-based polymer may comprise a combination of two or more embodiments described herein.

Crosslinking Agent (C)

Crosslinking agents include, but are not limited to, peroxide crosslinking agents, organic azides crosslinking agents, and combinations thereof.

In one embodiment, the crosslinking agent is selected from at least one peroxide crosslinking agent, at least one organic azide crosslinking agent, or a combination thereof. In a further embodiment, the crosslinking agent is selected from at least one peroxide.

Peroxides include, but are not limited to, as di-tertbutyl peroxide, tertbutylcumyl peroxide, dicumyl peroxide, 2,5-dimethyl-2,5-di-(tertbutylperoxy)hexane, di-(tertbutylperoxyisopropyl) benzene, tertbutyl peroxybenzoate, and 1,1-di-(tertbutylperoxy)-3,3,5-trimethylcyclohexane.

Organic azides crosslinking agent include, but are not limited to, benzene-1,3-bis(sulfonyl) azide and cyclo-hexane-1,4-di(sulfonyl)-azide.

In one embodiment, the crosslinking agent is present in an amount of from 0.1 to 8 phr, or further from 0.5 to 6 phr, or further from 1 to 2 phr, or further from 1 to 5 phr, or further from 0.8 to 3 phr, based on parts of component (A).

A crosslinking agent may comprise a combination of two or more embodiments as described herein.

Multifunctional Acrylate Coagent (D)

The inventive composition comprises a multifunctional acrylate coagent.

"Multifunctional acrylates" are compounds that include two or more residues of acrylic acid and/or methacrylic acid attached to the compound with an ester or amide linkage.

The coagent, component (D), is a multifunctional acrylate, or a combination of two or more thereof.

In one embodiment, the coagent is a bifunctional acrylate. In yet another embodiment, the coagent is a trifunctional acrylate.

In one embodiment, the multifunctional acrylate is selected from the following: a diacrylate, a dimethacrylate, a triacrylate, a trimethacrylate, or combinations thereof. In a further embodiment, the multifunctional acrylate comprises at least 8 carbon atoms, further at least 10 carbon atoms. In a further embodiment, the acrylate comprises at least 2 carbon-carbon double bonds.

In one embodiment, the coagent is in liquid form at atmospheric pressure and 25° C.

In one embodiment, the coagent does not contain a silica or silicate support.

In one embodiment, the multifunctional acrylate coagent comprises trimethylolpropane triacrylate (TMPTA), which has the following structure:

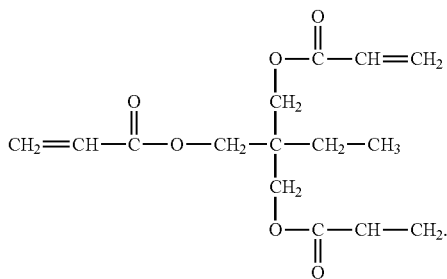

In another embodiment, the multifunctional acrylate coagent comprises trimethylolpropage trimethacrylate (TMPTMA), which has the following structure:

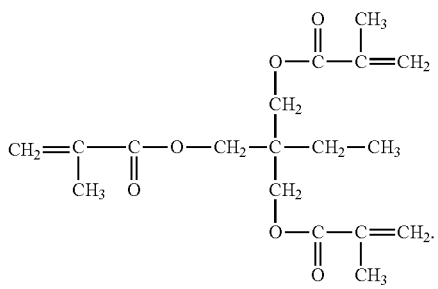 [SMILES: C=C(C)C(=O)OCC(CC)(COC(=O)C(=C)C)COC(=O)C(=C)C]

In another embodiment, the multifunctional acrylate coagent comprises Ethylene Glycol Dimethacrylate (EGDMA).

In another embodiment, the multifunctional acrylate coagent comprises Ethylene Glycol Diacrylate (EGDA).

In one embodiment, the coagent comprises a multifunctional acrylate selected from the group consisting of trimethylolpropage trimethacrylate (TMPTMA), trimethylolpropane triacrylate (TMPTA), Ethylene Glycol Dimethacrylate (EGDMA), Ethylene Glycol Diacrylate (EGDA), or combinations thereof.

In one embodiment, the coagent comprises a multifunctional acrylate selected from the group consisting of trimethylolpropage trimethacrylate (TMPTMA), trimethylolpropane triacrylate (TMPTA), or combinations thereof.

A multifunctional coagent may be two or more of the multifunctional coagents described herein.

Applications

The present invention also provides a process of making TPV composition comprising blending component B and cured component A by dynamic vulcanization.

The thermoplastic vulcanizates based on the inventive composition are preferably prepared by utilizing dynamic vulcanization techniques. Dynamic vulcanization is a process whereby a blend of plastic, rubber and rubber curative is masticated, while curing the rubber. The term "dynamic" indicates the mixture is subjected to shear forces during the vulcanization step, as contrasted with "static" vulcanization, wherein the vulcanizable composition is immobile (in fixed relative space) during the vulcanization step. One advantage of dynamic vulcanization is that elastoplastic (thermoplastic elastomeric) compositions may be obtained when the crosslinked rubber is well dispersed in the thermoplastic matrix. Examples of dynamic vulcanization are described in U.S. Pat. Nos. 3,037,954; 3,806,558; 4,104,210; 4,116,914; 4,130,535; 4,141,863; 4,141,878; 4,173,556; 4,207,404; 4,271,049 4,287,324; 4,288,570; 4,299,931; 4,311,628 and 4,338,413; each reference is incorporated herein by reference.

A variety of mixing equipment can be employed to prepare TPV by dynamic vulcanization process. Illustrative mixing equipment include: batch mixers, such as BRABENDER mixers, BANBURY mixers, continuous mixers such as FARREL continuous mixers, and extruders with one or more screws such as COPERION ZSK 53. One or more such mixing equipment, including extruders, can be used in series.

The thermoplastic, rubber and curatives can be added to a heated mixer as individual feed streams, as a dry blend, or as a masterbatch. When an extruder is used to prepare the TPV, if additional oil is needed, the oil is preferably added from a port provided in the melt mixing device using a gear pump or the like. Moreover, additional additives or materials, including other resins and elastomers, may be added by a side feeder on the melt mixing device or the like.

In one embodiment, the composition further comprises at least one additive. In a further embodiment, the additive is selected from antioxidants, stabilizers, pigments, or combinations thereof. In a further embodiment, the at least one additive is present in an amount from 0.1 to 5 weight percent, preferably from 0.1 to 1 weight percent, based on the weight of the composition.

In one embodiment, the composition further comprises a filler. In a further embodiment, the filler is selected from the group consisting of $CaCO_3$, clay, talc, carbon black, and combinations thereof. In one embodiment, the filler is present in an amount from 1 to 50 weight percent, preferably 1 to 30 weight percent, based on the weight of the composition.

In one embodiment, the composition further comprises the following:

Component D: an extender oil, such as paraffin oil or other plasticizers;

Component E: a filler, such as clay or other fillers;

Component F: optionally, other processing aids or additives, such as antioxidants.

The invention provides for an article comprising at least one component formed from an inventive composition.

Articles include, but are not limited to, profiles, films, sheets, automotive profiles, building and construction materials (for example, door profiles, window profiles, and roofing materials), computer components, belts, artificial leather, artificial turf, fabrics, laminates, or injection molded parts, footwear components, carpet components, ball bladders, inflation devices, swimming pool liners, air beds, toys, and furniture parts.

Articles can be formed by generally known methods, including, but not limited to, extrusion processes, injection molding, and compression molding.

DEFINITIONS

Unless stated to the contrary, implicit from the context, or customary in the art, all parts and percents are based on weight, and all test methods are current as of the filing date of this disclosure.

The term "composition," as used herein, includes a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities, such as catalyst residues, can be incorporated within the polymer.

The term "copolymer," as used herein, refers to polymers prepared by the polymerization of two different types of monomers.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term, "olefin-based polymer," as used herein, refers to a polymer that comprises a majority amount of polymerized olefin monomer, for example, ethylene or propylene, (based on the weight of the polymer), and optionally may comprise one or more comonomers.

The term, "ethylene-based polymer," as used herein, refers to a polymer that comprises a majority amount of polymerized ethylene monomer (based on the weight of the polymer), and optionally may comprise one or more comonomers.

The term, "ethylene/α-olefin copolymer," as used herein, refers to a copolymer that comprises a majority amount of polymerized ethylene monomer (based on the weight of the copolymer), and an α-olefin, as the only two monomer types.

The term, "propylene-based polymer," as used herein, refers to a polymer that comprises a majority amount of polymerized propylene monomer (based on the weight of the polymer), and optionally may comprise one or more comonomers.

The term, "propylene/α-olefin interpolymer," as used herein, refers to an interpolymer that comprises, in polymerized form, a majority amount of propylene monomer (based on the weight of the interpolymer), and at least one α-olefin.

The term, "propylene/α-olefin copolymer," as used herein, refers to a copolymer that comprises, in polymerized form, a majority amount of propylene monomer (based on the weight of the copolymer), and an α-olefin, as the only two monomer types.

The term, "propylene/ethylene interpolymer," as used herein, refers to an interpolymer that comprises, in polymerized form, a majority amount of propylene monomer (based on the weight of the interpolymer), and ethylene.

The term, "propylene/ethylene copolymer," as used herein, refers to a copolymer that comprises, in polymerized form, a majority amount of propylene monomer (based on the weight of the copolymer), and ethylene, as the only two monomer types.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

EXAMPLES

The following examples illustrate the present invention, but are not intended to limit the scope of the invention. Materials used in preparing the Inventive and Comparative Examples are listed in Table 1.

TABLE 1

| Material | Description | Commercial Supplier |
| --- | --- | --- |
| EO-1 | Ethylene octene random copolymer | The Dow Chemical Company (Midland, MI, USA) |
| EB-1 | Ethylene butene random copolymer | The Dow Chemical Company |
| EO-2 | Ethylene octene random copolymer | The Dow Chemical Company |
| PP (H110-02N) | Polypropylene homopolymer, 2MFR | Braskem (Philadelphia, PA, USA) |
| PARALUX 6001 | Paraffinic process oil | Chevron U.S.A. Inc.( San Ramon, CA, U.S.A.) |
| OMYACARB FT-FL | Surface treated calcium carbonate | Omya North America |
| LUPEROX 101 XL-45 | Peroxide crosslink agent, 45% active, 2,5-Bis(tert-butylperoxy)-2,5-dimethylhexane, blend with calcium carbonate and silica | Arkema Inc. (King of Prussia, PA, USA) |
| LUPEROX F40M-SP | Peroxide crosslink agent, 40% active, 1,3 1,4-Bis (tert-butylperoxyisopropyl) benzene. Blend with calcium carbonate and EPM | Arkema Inc. |
| TAIC-TLC-72 | Coagent, Triallyl isocyanuate | Harwick Standard Dist Corp. (Akron, OH, USA) |
| SARET SR519-HP | Coagent, a non-nitrosamine retarded trimethylolpropane triacrylate (TMPTA) | Sartomer LLC (Exton, PA, USA) |
| HVA-2 | Coagent, N,N'-phenylene bismaleimide | Cray Valley (Exton, PA, USA) |
| SARET SR350 | Coagent, trimethylolpropane trimethacrylate (TMPTA) | Sartomer LLC |
| IRGANOX 1026 | Antioxidant | BASF, North America (Florham Park, N.J., USA) |

A summary of properties of ethylene α-olefin copolymers used in example TPV compositions are listed in Table 2.

TABLE 2

| Sample | Density g/cc | Mw g/mole | Mn g/mole | Mw/Mn | Mooney Viscosity (ML 1 + 4, 121° C.) |
|---|---|---|---|---|---|
| EO-1 | 0.857 | 176900 | 86600 | 2.0 | 25 |
| EO-2 | 0.863 | 182500 | 93600 | 2.0 | 37 |
| EB-1 | 0.860 | 143600 | 64240 | 2.2 | 47 |

TPV Compositions of Comparative Examples (Comp. Ex.) A-D and Inventive Examples (Inv. Ex.)1-4 are shown in Table 3. TPV Compositions of Comparative Example E and Inventive Examples 5-9 are shown in Table 4. Properties of the compositions are also shown in tables 3 and 4.

TABLE 3

| | Comp. Ex. A | Comp. Ex. B | Comp. Ex. C | Comp. Ex. D | Inv. Ex. 1 | Inv. Ex. 2 | Inv. Ex. 3 | Inv. Ex. 4 |
|---|---|---|---|---|---|---|---|---|
| Formulation in phr | phr | phr | Phr | phr | phr | phr | phr | phr |
| EO-1 | 100 | | 100 | 100 | 100 | 100 | 100 | 100 |
| EB-1 | | 100 | | | | | | |
| PP H110-02N | 45 | 45 | 45 | 45 | 45 | 45 | 45 | 45 |
| PARALUX 6001 - Paraffinic Oil | 70 | 70 | 70 | 70 | 70 | 70 | 70 | 70 |
| Peroxide (LUPEROX 101-XL45) | 3 | 3 | | | | | | |
| Peroxide (LUPEROX F40M-SP) | | | 3 | 3 | 3 | 3 | 3 | 5 |
| TAIC Coagent (TAIC-DLC-72) | 1.88 | 1.88 | 1.88 | | | | | |
| TMPTA Coagent (SARET SR519-HP) | | | | | 1.35 | 2.7 | 4.05 | 2.25 |
| Coagent (HVA-2) | | | | 1.35 | | | | |
| IRGANOX 1076 | 0.25 | 0.25 | 0.25 | 0.25 | 0.25 | 0.25 | 0.25 | 0.25 |
| Properties | | | | | | | | |
| Hardness (ShA 10 s) | 63 | 66 | 60 | 60 | 57 | 56 | 60 | 57 |
| Compression Set 70 hr@ 120° C. (%) | 53 | 60 | 81 | 93 | 64 | 61 | 61 | 60 |
| Compression Set 22 hr@ 70° C. (%) | 36 | 43 | 59 | 70 | 44 | 44 | 46 | 41 |
| Compression Set 22 hr@ 23° C. (%) | 29 | 29 | 32 | 33 | 28 | 30 | 30 | 27 |
| 100% Modulus (psi) | 362 | 342 | 318 | 296 | 290 | 316 | 334 | 312 |
| Elongation (%) | 237 | 163 | 282 | 319 | 269 | 267 | 256 | 245 |
| Tensile Strength (psi) | 571 | 393 | 476 | 458 | 450 | 501 | 526 | 496 |
| Tear Strength (lbf/inch) | 113 | 124 | 133 | 130 | 118 | 116 | 120 | 107 |
| MI ($I_2$@190° C.) (g/10 min) (after crosslinking) | 13 | 12 | 9 | 17 | 17 | 14 | 12 | 16 |
| Extrusion Surface Quality | fail | fail | Fail | pass | pass | pass | pass | pass |

TABLE 4

| | Comp. Ex. E | Inv. Ex. 5 | Inv. Ex. 6 | Inv. Ex. 7 | Inv. Ex. 8 | Inv. Ex. 9 |
|---|---|---|---|---|---|---|
| Peroxide | Luperox 101-XL45 | Luperox 101-XL45 | Luperox 101-XL45 | Luperox 101-XL45 | Luperox 101-XL45 | Luperox 101-XL45 |
| Coagent | TMPTMA | TMPTMA | TMPTMA | TMPTMA | TMPTMA | TMPTMA |
| peroxide/coagent wt ratio | 1/10 | 1/4 | 1/2 | 1/4 | 1/4 | 1/4 |
| Formulation in phr | phr | Phr | phr | phr | phr | phr |
| EO-2 | 100 | 100 | 100 | 100 | 100 | 100 |
| PP H110-02N | 55 | 55 | 55 | 55 | 55 | 55 |
| PARALUX 6001 - Paraffinic Oil | 70 | 70 | 70 | 70 | 70 | 70 |
| CaCO3 | 30 | 30 | 30 | 30 | 30 | 30 |
| Peroxide (LUPEROX 101-XL45) | 1.25 | 1.25 | 3 | 3 | 2.125 | 2.125 |

TABLE 4-continued

|  | Comp. Ex. E | Inv. Ex. 5 | Inv. Ex. 6 | Inv. Ex. 7 | Inv. Ex. 8 | Inv. Ex. 9 |
|---|---|---|---|---|---|---|
| TMPTMA Coagent (SR-350) | 5.625 | 2.25 | 2.7 | 5.4 | 3.825 | 3.825 |
| IRGANOX 1076 | 0.25 | 0.25 | 0.25 | 0.25 | 0.25 | 0.25 |
| Subtotal - Materials Properties | 262.125 | 258.75 | 260.95 | 263.65 | 261.2 | 261.2 |
| Hardness (ShA 10 s) | 70 | 70 | 71 | 73 | 72 | 73 |
| Compression Set 70 hr@120° C. (%) | 87 | 73 | 48 | 58 | 65 | 61 |
| Compression Set 22 hr@ 70° C. (%) | 68 | 56 | 32 | 38 | 45 | 42 |
| Compression Set 22 hr@ 23° C. (%) | 34 | 35 | 29 | 26 | 28 | 25 |
| 100% Modulus (psi) | 408 | 400 | 430 | 475 | 461 | 454 |
| Elongation (%) | 470 | 525 | 400 | 374 | 424 | 413 |
| Tensile Strength (psi) | 765 | 856 | 975 | 1019 | 996 | 1005 |
| Tear Strength (lbf/inch) | 198 | 201 | 160 | 171 | 182 | 175 |
| MI ($I_{10}$@230° C.) (g/10 min) (after crosslinking) | 71 | 59 | 121 | 73 | 81 | 22 |
| Extrusion Surface Quality | pass | pass | pass | pass | pass | pass |

Table 3 compares the physical properties of TPV compositions made from different coagent. At similar ShA hardness, all comparatives examples have either deficient extrusion properties or inferior compression set properties. Table 4 compares the physical properties of TPV compositions made with different peroxide to coagent weight ratios. At similar ShA hardness, Comparatives example E has significant inferior compression set properties than those of all the inventive examples.

TEST METHODS AND SAMPLE PREPARATIONS

Density

Density is measured in accordance with ASTM D-792.

Mooney Viscosity (ML 1+4, 121° C.)

Mooney Viscosity (ML1+4 at 121° C.) was measured in accordance with ASTM 1646, with a one minute preheat time and a four minute rotor operation time. The instrument is an Alpha Technologies Mooney Viscometer 2000.

Melt Index

Melt index ($I_2$) for the ethylene-based polymers, in g/10 min, was measured using ASTM D-1238 (Condition 190° C./2.16 kg). The notation "I5" refers to a melt index, in g/10 min, measured using ASTM D-1238, Condition 190° C./5.0 kg. The notation "I10" refers to a melt index, in g/10 min, measured using ASTM D-1238, Condition 190° C./10.0 kg. The notation "I21" refers to a melt index, in g/10 min, measured using ASTM D-1238, Condition 190° C./21.6 kg. For propylene-based polymers, the melt flow rate (MFR) was measured using ASTM D-1238 (Condition 230° C./2.16 kg).

Gel Content

Gel content can be measured by a small scale Soxhlet extraction method. Samples are cut into small pieces, ranging from about 35 mg to 86 mg. Three pieces of each sample are individually weighed, to at least four digits, on a top-loading electronic analytical balance. Each piece is placed inside a small cylinder composed of aluminum window screen. The ends of the cylinders are closed with ordinary paper staples. Six aluminum cylinders are placed inside one fritted glass extraction thimble. The thimbles are placed in jacketed Soxhlet extractors, and extracted overnight with refluxing xylenes. At the end of the minimum 12 hour extraction, the still warm thimbles are quenched in methanol. The methanol precipitates the gel, to facilitate removal of the gels, intact from the cylinders. The cylinders containing precipitated gels are purged briefly with nitrogen to drive off free methanol. The gels are removed from the aluminum cylinders with forceps, and placed on aluminum weighing pans. The pans with gels are vacuum dried for one hour at 125° C. The dried, cool gels are removed from aluminum weighing pans, and weighed directly on the top-loading analytical balance. The dry extracted gel weight is divided by the starting weight to give the percent gel content.

Gel Permeation Chromatography (GPC)

Conventional GPC measurements were used to determine the weight-average (Mw) and number-average (Mn) molecular weight of the polymer, and to determine the MWD (=Mw/Mn). Samples were analyzed with a high-temperature GPC instrument (Polymer Laboratories, Inc. model PL220).

The method employs the well-known universal calibration method, based on the concept of hydrodynamic volume, and the calibration was performed using narrow polystyrene (PS) standards along with four mixed A, 20 μm columns (PLgel Mixed A from Agilent (formerly Polymer Laboratory Inc.)), operating at a system temperature of 140° C. Samples were prepared at a "2 mg/mL" concentration, in 1,2,4-trichlorobenzene solvent. The flow rate was 1.0 mL/min, and the injection size was 100 microliters.

The molecular weight determination was deduced by using narrow molecular weight distribution polystyrene standards (from Polymer Laboratories), in conjunction with their elution volumes. The equivalent polyethylene molecular weights were determined by using appropriate Mark-Houwink coefficients for polyethylene and polystyrene (as described by Williams and Ward in *Journal of Polymer Science, Polymer Letters*, Vol. 6, (621) 1968) to derive the following equation:

$$M\text{polyethylene} = a^*(M\text{polystyrene})^b.$$

In this equation, a=0.4316 and b=1.0. Weight average molecular weight (Mw) and number average molecular weight (Mn) were calculated in the usual manners. For example, Mw was calculated according to the following formula: Mw=Σ wi Mi, where wi and Mi are the weight fraction and molecular weight, respectively, of the ith fraction eluting from the GPC column. Polyethylene equivalent molecular weight calculations were performed using Viscotek TriSEC software Version 3.0.

Differential Scanning Calorimetry

Differential Scanning calorimetry (DSC) can be used to measure melting temperature, crystallization temperature, and crystallinity of ethylene-based polymer (PE) samples and propylene-based polymer (PP) samples. About five to eight mg of sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for PP). The sample is kept at this temperature for three minutes. Then the sample is cooled, at a rate of 10° C./min, to −60° C. for PE (−40° C. for PP), and kept isothermally at that temperature for three minutes. The sample is next heated at a rate of 10° C./min, until complete melting (second heat). The percent crystallinity is calculated by dividing the heat of fusion (Hf), determined from the second heat curve, by a theoretical heat of fusion of 292 J/g for PE (165 J/g, for PP), and multiplying this quantity by 100 (for example, % cryst.=(Hf/292 J/g)×100 (for PE)).

Unless otherwise stated, melting point(s) (Tm) of each polymer sample is determined from the second heat curve, obtained from DSC, as described above. The crystallization temperature (Tc) is measured from the first cooling curve. The Tm is the temperature measured at the peak of the endotherm, as shown on the heating curve. The Tc is the temperature measured at the peak of the exotherm, as shown on the cooling curve.

Representative Thermoplastic Vulcanizate (TPV) Preparation:

The following components were blended (dry mixed): EAO copolymer (EO or EB), peroxide, and coagent to form a preblend. The preblend was fed using a K-TRON SODER K2LS60 Loss-In-Weight Feeder. The compounding was performed on a 26-mm co-rotating twin screw extruder. The extruder consisted of twelve barrel sections, resulting in a total length-to-diameter ratio (L/D) of 60. The extruder was equipped with a 24 kW motor and a maximum screw speed of 1200 rpm. The feed system for this extrusion line consisted of two "loss-in-weight" feeders. Polypropylene was fed separately into the extruder. The oil was fed continuously to barrel 2 of the extruder using separate gear pumps. The TPV composition was pelletized using an underwater pelletization unit with a 1 hole die.

Shore A Hardness

Hardness measurements were taken with a Shore A type durometer. The durometer was placed onto a TPV plaque of approximately 3 mm thickness (0.125 inch), prepared according to the injection molding procedure above.

Compression Set

Compression set was measured according to ASTM D-395 at 23° C., 70° C. and 120° C. Pucks of diameter of 29 mm (±0.5 mm) were extracted from the compression molded plaques of approximately 3 mm (⅛ inch) thickness, as discussed above. For each sample, four pucks were inspected for notches, uneven thickness and inhomogeneity, and plaques that had good visual appearance were stacked, such that the total height was 12.5 mm (±0.5 mm), The final assembly was compressed to compressive strain of 25%. Per each TPV composition tested, the compression set analysis for each temperature/time measurement was performed on two test specimens, and the average of the two test specimens was recorded.

The stacked pucks (final assembly) were placed in the compressive device, and locked into place; the apparatus was then placed at the appropriate temperature for specified time (22 hrs at 23° C.; 22 hrs at 70° C., and 70 hrs at 120° C.). In this test, the stress is released at the test temperature, and the thickness of the sample is measured after a 30 minutes equilibration period, at room temperature. Compression set is a measure of the degree of recovery of a sample following compression, and is calculated according to the equation CS=(H0−H2)/(H0−H1), where H0 is the original thickness of the sample, H1 is the thickness of the spacer bar used, and H2 is the final thickness of the sample after removal of the compressive force.

Injection Molding

Thermoplastic vulcanizate (TPV) pellets were injection molded using a Krauss Maffei injection molder with the axxicon mold system. Table 5 provides the conditions of the injection molding of the test plaques which were "4 inch×6 inch×0.125 inch" in dimension. About twelve test plaques were prepared for each TPV composition.

TABLE 5

Injection molding condition for comparative and inventive examples

| Barrel and Mold Temperatures | |
| --- | --- |
| Hopper zone (° C.) | 40 |
| Zone 1 Temperature (° C.) | 121 |
| Zone 2 Temperature (° C.) | 175 |
| Zone 3 Temperature (° C.) | 204 |
| Zone 4 Temperature (° C.) | 204 |
| Zone 5 Temperature (° C.) | 204 |
| Nozzle Temperature (° C.) | 200 |
| Mold Temperature (° F.) | 65 |
| Extruder | |
| RPM (1/min) | 300 |
| Backpressure (Bar) | 15 |
| Dosage Delay (s) | 3 |
| Dosage (ccm) | 75 |
| Suckback (ccm) | 5 |
| Optimal Injection | |
| Injection Speed #1 (ccm/s) | 25 |
| Injection pressure #1 (bar) | 2000 |
| Injection Time #1 (s) | 2.6 |
| Switch Over Position (ccm) | 15 |
| Switch over melt pressure (bar) | 113 |
| Max Melt pressure (bar) | 295 |
| Cushion (ccm) | 6.7 |
| Hold | |
| Hold Pressure (Bar) | 250 |
| Hold Time (s.) | 20 |
| Time | |
| Cool Time (s.) | 20 |
| Cycle Time (s.) | 52.3 |

Stress-Strain Properties

Tensile properties were measured using specimens which were die cut using a small dog bone shaped micro tensile die, having the dimensions described in ASTM D-1708. The die cut specimens were cut from injection molded plaques, which were prepared as described under the above Injection Molding section. Tensile properties (modulus, tensile strength and elongation) were measured at room temperature, following the method of ASTM D-412, in the machine direction, on an INSTRON Model 1122, made by INSTRU-MET Corporation.

Tear Strength

Tear strength (Die C) were determined according to standard test method ASTM D 624. Test specimens are cut from the injection molded plaque using cutting dies conforming to Type-C shape described in ASTM D624. The test is done on an INSTRON. The rate of jaw separation shall be 500±50 mm/min, the test specimen is strained until it is completely ruptured. The maximum force is recorded and the tear strength is calculated by the formula:

$$T_s = F/d$$

Where: F=the maximum force, in lb and
D=the median thickness of each test specimen, in inch Tape Extrusion:

A Haake Rheocord System 9000 torque rheometer with a Rheomix 254 extruder was used to prepare the extruded tapes. The Rheomix 254 is a 25 L/D single screw extruder equipped with ¾ inch screw and four zones. The extrusion process parameters were optimized for each material based on its rheological properties. A 0.25 mm thick tape sample with smooth surface was produced with each TPV material.

Extrusion Surface Quality

The surface quality of extruded tape made from the TPV compound was evaluated using a visual rating of the tape appearance and smoothness, its uniform edges and smooth surface. Additionally, the surface roughness can be measured using a profilometer.

Typically surface roughness can be in the range from 0.0001 to 0.0002 mm. A "fail rating" results when raise surfaces are visually apparent on the tape surface, to give the film a coarse surface texture. A coarse surface texture is indicative of poor dispersion of the rubber phase, and may also represent an incomplete phase inversion (when thermoplastic polymer (e.g., PP) becomes the continuous phase). A "pass rating" results when the tape has a smooth, uniform surface.

Although the invention has been described in considerable detail in the preceding examples, this detail is for the purpose of illustration, and is not to be construed as a limitation on the invention, as described in the following claims.

The invention claimed is:

1. A crosslinked composition formed from a composition comprising at least the following:
   (A) an ethylene/a-olefin copolymer;
   (B) an olefin-based polymer;
   (C) a crosslinking agent; and
   (D) a multifunctional acrylate coagent;
   wherein the ethylene/a-olefin copolymer of component A) has the following properties:
      (i) has a density from 0.855 to 0.875 g/cc; and
      (ii) a Mooney Viscosity (ML 1+4, 121° C.) from 10 to 100; and
   wherein the crosslinked composition has a compression set (22 hrs, 70° C.) less than, or equal to, 48%.

2. The crosslinked composition of claim 1, wherein the weight ratio of crosslinking agent to coagent is from 2:1 to 1:4.

3. The crosslinked composition of claim 1, wherein the coagent is trimethylolpropane triacrylate, trimethylolpropane trimethacrylate, or a combination thereof.

4. The crosslinked composition of claim 1, wherein crosslinking agent is present in an amount of from 0.1 to 8 parts per hundred parts of component (A).

5. The crosslinked composition of claim 1, wherein component (A) is present in an amount of from 55 to 85 percent by weight and component (B) is present in an amount from 45 to 15 percent by weight based upon the total weight of components (A) and (B).

6. The crosslinked composition of claim 1, wherein the coagent does not contain a silica or silicate support.

7. The crosslinked composition of claim 1, wherein the composition comprises less than 1 ppm, based on the total weight of the composition, of any component selected from the group consisting of benzene, isocyanurate, and combinations thereof.

8. The crosslinked composition of claim 1, wherein the coagent is in liquid form at atmospheric pressure and 25° C.

9. The crosslinked composition of claim 1, wherein the crosslinking agent is selected from the group consisting of 2,5-dimethyl-2,5-di(t-butylperoxy)hexane; 1,3 1,4-Bis(tert-butylperoxyisopropyl) benzene; and combinations thereof.

10. An article comprising at least one component formed from the crosslinked composition of claim 1.

11. The article of claim 10, wherein the article is a profile, sheet, hose, pipe, or an injection molded part.

* * * * *